United States Patent Office 3,324,130
Patented June 6, 1967

3,324,130
MANUFACTURE OF PIPERAZINE
George E. Ham, Lake Jackson, and Prella M. Phillips, Angleton, Tex., assignors to The Dow Chemical Company, Midland, Mich., a corporation of Delaware
No Drawing. Filed Mar. 24, 1965, Ser. No. 442,538
3 Claims. (Cl. 260—268)

This invention relates to the preparation of piperazine.

It is known that piperazine may be prepared by passing diethylenetriamine over a Raney nickel catalyst at temperatures of from 175°–225° C. under pressures of from 3000–5000 p.s.i.g. Such a process is disclosed, for example, in U.S. Patent 2,809,195 to Miller. The dimerization of N-substituted aziridines (such as 1-methyl aziridine to N,N-dimethyl piperazine) is reported in "Heterocyclic Compounds," vol. I, pages 69–70 by Elderfield. Numerous other commercial methods for the preparation of piperazine are known and are widely used. Piperazine is known to be useful as an anthelmintic.

It has now been found that piperazine may be prepared by means of a novel ring closing reaction under very mild reaction conditions. The process of the invention is based upon the following reaction which comprises contacting the dihydrohalide salt of 2-(2'-haloethylamino)ethylamine with a suitable base to produce piperazine:

(1)

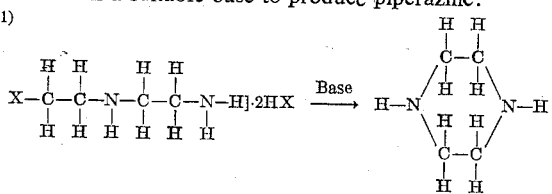

wherein each X (which may be the same or different) represents a halogen atom (and preferably a middle halogen: Br or Cl).

Any base which is capable of dehydrohalogenating the starting 2-(2'-haloethylamino)ethylamine may be used in the process. Suitable bases include the alkali metal and alkaline earth metal hydroxides (such as NaOH, KOH, LiOH, Ca(OH)$_2$), carbonates (Na$_2$CO$_3$ NaHCO$_3$, K$_2$CO$_3$, KHCO$_3$, CaCO$_3$, Ca(HCO$_3$)$_2$, Ba(HCO$_3$)$_2$, etc.) as well as other conventional bases and acid acceptors such as basic ion exchange resins, KH$_2$PO$_4$, Na$_2$HPO$_4$, CaHPO$_4$, Ca$_3$(PO$_4$)$_2$ and other materials which react with acids (especially mineral acids such as the hydrohalic acids: HCl, HBr and HI) to produce salts. Metal carbonates are not preferred bases unless it is desired to produce piperazine carbonate. The base and dihydrochloride compound may be combined in any convenient manner using conventional reactors and process equipment. An amount of base sufficient to completely dehydrohalogenate the 2-(2'-haloethylamino)ethylamine dihydrohalide is employed. At least three equivalents of base for every mole of 2-(2'-haloethylamino)ethylamine are ordinarily used.

Reaction (1) may be carried out in the presence of any inert solvent such as water, alcohols (ethanol, n-propanol, i-propanol, etc.) or ketones (acetone, methyl ethyl ketone, etc.). Any solvent which does not destroy the piperazine ring formed in the reaction may be employed. The reaction may be carried out at any temperature of from about −10° C. to about 110° C. (preferably from about −5° C. to 105° C.). Higher temperatures tend to reduce the amount of piperazine which is formed. Reaction times sufficient to produce practical amounts (i.e., more than trace amounts) of piperazine are used. At temperatures of from −10° C. to 110° C., reaction times of from about a few minutes to 3 to 4 days may be used (preferably from about 1 to 3 hours). The reaction is not pressure sensitive and any pressure of from a few millimeters of mercury up to about 200 atmospheres may be used. The reaction is preferably carried out at atmospheric pressure.

The starting 2-(2'-haloethylamino)ethylamine compounds may be prepared according to the following equation

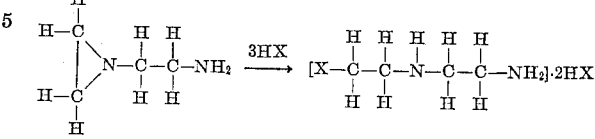

wherein X is as previously defined.

In this reaction sequence, the dimer of aziridine (ethylenimine) is treated with an amount of hydrohalic acid sufficient to provide three moles of hydrohalic acid per mole of aziridine dimer to form the dihydrohalic acid salt of 2-(2'-haloethylamino)ethylamine.

The starting dihydrohalic acid salts of 2-(2'-haloethylamino)ethylamine used in the process of the invention may also be prepared by reacting a thionyl halide (such as a thionyl chloride or thionyl bromide) with an alkanolamine according to the method disclosed by Wilson et al., in J. Am. Chem. Soc., vol. 73, pp. 3635–41 (August 1951):

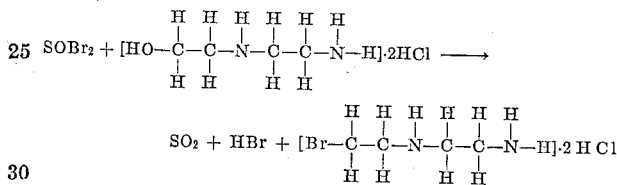

When SOCl$_2$ is used as a reactant instead of SOBr$_2$, the corresponding dihydrochloride salt of 2-(2'-chloroethylamino)ethylamine is obtained.

In a particularly advantageous embodiment of the process of the invention, piperazine is produced continuously using the dimer of ethylenimine [1-(2-aminoethyl)aziridine] and a hydrohalic acid HX (X is a halogen and preferably a middle halogen such as bromine or chlorine) as starting materials. In this embodiment of the invention, use is made of a side reaction which occurs during the cyclization of 2-(2'-haloethylamino)ethylamine dihydrohalide. In this side reaction, 1-(2-aminoethyl)aziridine (ethylenimine dimer) is generated as a by-product in the production of piperazine. This regenerated ethylenimine dimer is then separated and further reacted with additional hydrohalic acid to produce more 2-(2'-haloethylamino)ethylamine dihydrohalide which is then reacted with a base to produce additional piperazine and ethylenimine dimer. From about 3 to 20 equivalents of base per mole of 2-(2'-haloethylamino)ethylamine may be used. This preferred embodiment of the process may be illustrated by the following reactions:

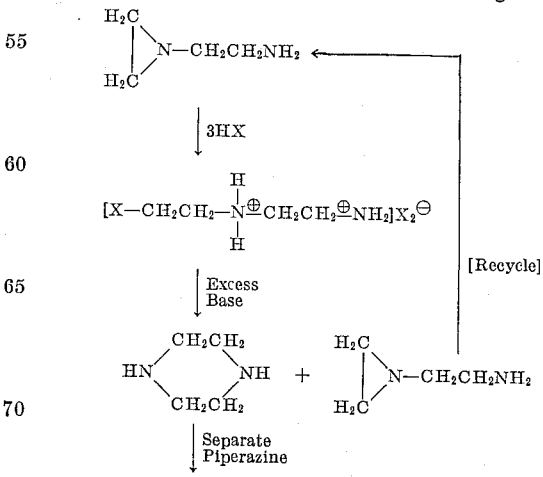

wherein each X represents a halogen atom (preferably a bromine or chlorine atom). By recycling the ethylenimine dimer produced as a by-product, substantially 100 percent conversion of ethylenimine dimer to piperazine may be obtained.

The following examples are submitted for the purpose of illustration only and are not to be construed as limiting the scope of the invention in any way.

Example I

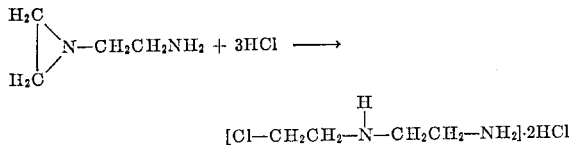

$$[\text{Cl}-\text{CH}_2\text{CH}_2-\overset{\text{H}}{\underset{|}{\text{N}}}-\text{CH}_2\text{CH}_2-\text{NH}_2]\cdot 2\text{HCl}$$

Into a reaction vessel equipped with a stirrer, thermometer, condenser, dropping funnel and a cold bath for controlling the temperature was placed concentrated (approximately 16 Normal) HCl. A quantity of 1-(2-aminoethyl)aziridine sufficient to provide a final ratio of reactants of 1 mole of 1-(2-aminoethyl)aziridine for every 3 moles of HCl was added to the dropping funnel. The 1-(2-aminoethyl)aziridine was slowly added to the concentrated HCl so as to maintain the temperature of the reaction vessel at 10° C.±5° C. After completion of the addition of 1-(2-aminoethyl)aziridine, the temperature of the reaction mixture was raised to room temperature (approximately 22° to 27° C.) and this temperature was maintained for 30 minutes.

Various amounts of the 2-(2'-chloroethylamino)ethylamine dihydrochloride prepared in Example I were transferred to other reaction vessels and used in the ring-closing reactions of Examples II–VIII.

Examples II–VIII

To reaction vessels equipped as in Example I were added caustic (NaOH) solutions of varying concentrations. Each caustic solution contained a total of 0.9 mole of NaOH, plus the amounts of solvents shown in Table 1. To each of these caustic solutions was added dropwise 0.230 mole of 2-(2'-chloroethylamino)ethylamine dihydrochloride. The reaction temperatures, reaction time, solvents and yields are given in Table 1. The reaction products contained piperazine and 1-(2-aminoethyl) aziridine. Instead of recycling the 1-(2-aminoethyl) aziridine to prepare more piperazine, only a single reaction cycle was carried out in order to estimate the yields per cycle.

TABLE 1

| Example Number | Temp. (° C.) | H₂O (Moles) | Other Solvent (Moles) | Reaction Time (Hrs./Mins.) | Piperazine (Percent Yield) | 1-(2-aminoethyl)-aziridine (Percent Yield) |
|---|---|---|---|---|---|---|
| II | About 25 | 20 | 0 | 1/18 | 30.7 | 66.5 |
| III | ---do--- | 4 | 0 | 1/15 | 32.7 | 64.7 |
| IV | −4 to +3 | 20 | 0 | 97/06 | 40.2 | 59.1 |
| V | 25 to 26 | 20 | 0 | 1/18 | 30.7 | 66.5 |
| VI | 103 | 20 | 0 | 1/03 | 14.5 | 81.3 |
| VII | About 25 | 0 | (¹) | 2/35 | 36.5 | 41.2 |
| VIII | ---do--- | 10 | (²) | 3/0 | 28.5 | 32.7 |

¹ Methyl alcohol 10.
² Isopropyl 10.

The piperazine and 1-(2-aminoethyl)aziridine yields were determined by infrared analysis and are based on the amount of 2-(2'-chloroethylamino)ethylamine dihydrochloride charged to the reactor. Substantially all of the 2-(2'-chloroethylamino)ethylamine dihydrochloride was converted to various reaction products during the reaction (i.e., essentially 100 percent conversion). These examples show that water has no adverse effect upon the ring closure of 2-(2'-chloroethylamino)ethylamine dihydrochloride and that an increase in temperature causes an increase in the formation of 1-(2-aminoethyl) aziridine with a corresponding decrease in the formation of piperazine.

Similar results were obtained using a mixture of acetone and water as a solvent for the sodium hydroxide.

We claim as our invention:
1. A method of continuously producing piperazine which comprises the steps of
    (a) reacting an acid HX (wherein X is a halogen atom) and 1-(2-aminoethyl)aziridine to produce 2-(2'-haloethylamino)ethylamine dihydrohalide (I),
    (b) contacting (I) with a base to produce a mixture containing piperazine and 1-(2-aminoethyl)aziridine,
    (c) separating the 1-(2-aminoethyl)aziridine from the reaction mixture of (b), and
    (d) recycling the separated 1-(2-aminoethyl)aziridine from (c) to step (a).
2. The process of claim 1 wherein the base is an alkali metal hydroxide.
3. The process of claim 1 wherein the base is an alkaline earth metal hydroxide.

References Cited
UNITED STATES PATENTS 3,239,528   3/1966   Von Bebenburg _____ 260—268

OTHER REFERENCES

Elderfield: Heterocyclic Compounds, vol. 1 (1950), page 68.
Sieber: Berichte, vol. 23 (1890), pages 326–27.
Weissberger: Heterocyclic Compounds, Part I (1964), pages 528–30 and 570.

ALEX MAZEL, Primary Examiner.

H. R. JILES, Assistant Examiner.